United States Patent Office 2,809,397
Patented Oct. 15, 1957

2,809,397

METHOD FOR PREPARING SELF LUBRICATING, ASBESTOS CONTAINING STUFFING BOX PACKINGS

Johann Zagorski, Vienna, Austria, and Johann Zagorski, Esslingen, Germany

No Drawing. Application September 18, 1953, Serial No. 381,142

7 Claims. (Cl. 18—47.5)

According to prior art asbestos fibre, the so called asbestos wool, is spun for use as stuffing box packing into threads and twisted into strings which are then mostly soaked with oil or grease, graphited or processed with talcum powder. Packings soaked with oil or grease have the disadvantage that they cannot be used with high temperatures as the oil or grease burns and the packing becomes hard and leaky. Such packings can also not be used with lyes or acids. Dry asbestos-graphite or asbestos-talc packings used as stuffing material have in comparison though a higher elasticity but only little plasticity, therefore little binding power and they thus cohere badly. Furthermore, dry asbestos absorbing but little graphite or talcum powder, they can serve, at best, only for stuffing slowly moving machine parts. It is known furthermore that a mixture of asbestos wool with talc, graphite with addition of molasses, isinglass, dextrine or similar binding agents is being used for stuffing purposes against gasoline, benzene, petroleum and other hydrocarbon compounds. These stuffings have the disadvantage that they cannot be used as stuffing against cold or warm water, lyes, acids or other liquids as they dissolve or are affected and cause a high resistance due to friction thus making the moving machine part which is to be stuffed unserviceable after comparatively short service on account of heavy wear. With admixtures of clay, Carborundum, metal chips this mass is used for linings in protection against high temperatures. This mass becomes stone-like hard with high temperatures and cannot be used as stuffing box packing.

The invention consists now in that to 20% to 60% asbestos wool or wadding-like asbestos, depending on its quality or its intended use and relating to the weight of the new packing, 5% to 15% soot, advantageously smoke black or retort carbon dust, or up to this percentage superfine ground glass powder or another superfine ground abrasive of almost colloidal fineness or up to this percentage these both are added simultaneously and in a drum the content is subjected, preferably in separated operations, to a rotating or shaking movement or both simultaneously, expediently with a beating effect and this so long a time that in consequence of roughening and further loosening the absorbing capacity of known mineral lubricants in the form of powder is inincreased considerably. Thereupon, depending on the intended use, 30% to 65%, relating to the weight of the new packing, graphite, talcum powder or steatite, oil shale or any mixtures of these matters are added in superfine ground state and the contents are subjected to a mixing procedure.

The packing mass prepared according to this method and ratio of mixtures has a great plasticity and elasticity, thus stuffing property as well as lubricating capacity. It may be used for stuffing against cold and warm water, as well as lyes and acids, vapours, gases, hydrocarbon compounds like gasoline, benzene and the like and up to temperatures of 600° C. Furthermore, it is qualified for stuffing both slowly and rapidly moving machine parts, for instance rotating shafts, reciprocating spindles and the like and needs neither an asbestos tress as bottom ring, nor a like one as cover ring in the stuffing box. Besides, the packing can be formed easily by hand and rings or cylinders may be pressed without difficulty when applying pressure.

The degree of binding power and strength of the packing can be still increased for special pressed parts by moistening the stuffing mass, before pressing, with water glass or a diluted water glass fluid, the diluting agent of which may be water, formaldehyde fluid or both of these simultaneously, advantageously under addition of methylic alcohol and glycerine.

Thereupon, the pressed rings or formed parts are subjected to a heat treatment of up to 150° C. until the pressed packing mass obtains a feltlike structure with which the good lubricating quality is maintained. Thereafter they are finish pressed to exact measurement in order to compress the stuffing mass correspondingly strongly; thereby it is furthermore obtained that the state of the pressed parts remains unaltered.

I claim:

1. A method of producing a self-lubricating packing, comprising the steps of agitating between 20 and 60 parts of fibrous asbestos in contact with between 5 and 15 parts of a finely divided solid abrasive material so as to loosen the fibers of said fibrous asbestos and increase the surface contact area thereof while retaining its fibrous structure; forming a mixture of the thus fiber-loosened fibrous asbestos, said finely divided solid abrasive material and between 30 and 65 parts of a dry, finely divided solid mineral lubricating material, said fiber-loosened fibrous asbestos holding said finely divided mineral lubricating material due to the large contact surface area and the loosening of the fibers of said asbestos by said finely divided abrasive material; and molding said mixture into shaped bodies of the same, whereby a resilient self-lubricating packing, resistant against temperatures up to 600° C. is obtained.

2. A method of producing a self-lubricating packing, comprising the steps of agitating between 20 and 60 parts of fibrous asbestos in contact with between 5 and 15 parts of a finely divided solid abrasive material so as to loosen the fibers of said fibrous asbestos and increase the surface contact area thereof while retaining its fibrous structure; forming a mixture of the thus fiber-loosened fibrous asbestos, said finely divided solid abrasive material and between 30 and 65 parts of a dry, finely divided solid mineral lubricating material, said fiber-loosened fibrous asbestos holding said finely divided mineral lubricating material due to the large contact surface area and the loosening of the fibers of said asbestos by said finely divided abrasive material; adding water glass to said mixture; and molding said water glass containing mixture into shaped bodies, whereby a resilient, self-lubricating packing, resistant against temperatures up to 600° C. is obtained.

3. A method of producing a self-lubricating packing, comprising the steps of agitating between 20 and 60 parts of fibrous asbestos in contact with between 5 and 15 parts of a finely divided solid abrasive material so as to loosen the fibers of said fibrous asbestos and increase the surface contact area thereof while retaining its fibrous structure; forming a mixture of the thus fiber-loosened fibrous asbestos, said finely divided solid abrasive material and between 30 and 65 parts of a dry, finely divided solid mineral lubricating material, said fiber-loosened fibrous asbestos holding said finely divided mineral lubricating material due to the large contact surface area and the loosening of the fibers of said asbestos by said finely divided abrasive material; adding a water glass containing fluid to said mixture; molding said fluid containing mixture into shaped bodies; heating said shaped bodies to a temperature up to 150° C. so as to obtain a felt-like structure; and compressing said shaped bodies having a felt-like structure to predetermined dimensions, whereby a resilient, self-lubricating packing, resistant against temperatures up to 600° C. is obtained.

4. A method of producing a self-lubricating packing, comprising the steps of agitating between 20 and 60 parts of fibrous asbestos in contact with between 5 and 15 parts of a finely divided solid abrasive material so as to loosen the fibers of said fibrous asbestos and increase the surface contact area thereof while retaining its fibrous structure; and forming a mixture of the thus fiber-loosened fibrous asbestos, said finely divided solid abrasive material and between 30 and 65 parts of a dry, finely divided solid mineral lubricating material selected from the group consisting of graphite, talcum powder, steatite and oil shale, said fiber-loosened fibrous asbestos holding said finely divided mineral lubricating material due to the large contact surface area and the loosening of the fibers of said asbestos by said finely divided abrasive material, whereby a resilient, self-lubricating packing, resistant against temperatures up to 600° C. is obtained.

5. A method of producing a self-lubricating packing, comprising the steps of agitating between 20 and 60 parts of fibrous asbestos in contact with between 5 and 15 parts of a finely divided solid abrasive material selected from the group consisting of soot, smoke black, retort carbon power and glass powder so as to loosen the fibers of said fibrous asbestos and increase the surface contact area thereof while retaining its fibrous structure; and forming a mixture of the thus fiber-loosened fibrous asbestos, said finely divided solid abrasive material and between 30 and 65 parts of a dry, finely divided solid mineral lubricating material selected from the group consisting of graphite, talcum powder, steatite and oil shale, said fiber-loosened fibrous asbestos holding said finely divided mineral lubricating material due to the large contact surface area and the loosening of the fibers of said asbestos by said finely divided abrasive material, whereby a resilient, self-lubricating packing, resistant against temperatures up to 600° C. is obtained.

6. A method of producing a self-lubricating packing, comprising the steps of agitating between 20 and 60 parts of fibrous asbestos in contact with between 5 and 15 parts of a finely divided solid abrasive material so as to loosen the fibers of said fibrous asbestos and increase the surface contact area thereof while retaining its fibrous structure; and forming a mixture of the thus fiber-loosened fibrous asbestos, said finely divided solid abrasive material and between 30 and 65 parts of a dry, finely divided solid mineral lubricating material, said fiber-loosened fibrous asbestos holding said finely divided mineral lubricating material due to the large contact surface area and the loosening of the fibers of said asbestos by said finely divided abrasive material, whereby a resilient, self-lubricating packing, resistant against temperatures up to 600° C. is obtained.

7. A method of producing a self-lubricating packing, comprising the steps of agitating between 20 and 60 parts of fibrous asbestos in contact with between 5 and 15 parts of a finely divided solid abrasive material selected from the group consisting of soot, smoke black, retort carbon powder and glass powder so as to loosen the fibers of said fibrous asbestos and increase the surface contact area thereof while retaining its fibrous structure; and forming a mixture of the thus fiber-loosened fibrous asbestos, said finely divided solid abrasive material and between 30 and 65 parts of a dry, finely divided solid mineral lubricating material selected from the group consisting of graphite, talcum powder, steatite and oil shale, said fiber-loosened fibrous asbestos holding said finely divided mineral lubricating material due to the large contact surface area and the loosening of the fibers of said asbestos by said finely divided abrasive material, whereby a resilient, self-lubricating packing, resistant against temperatures up to 600° C. is obtained.

References Cited in the file of this patent

UNITED STATES PATENTS

| | | |
|---|---|---|
| 325,889 | Wendell | Sept. 8, 1885 |
| 621,797 | Curtis | Mar. 28, 1899 |
| 1,133,204 | Warrell | Mar. 23, 1915 |
| 1,698,655 | Rautenstrauch | Jan. 8, 1929 |
| 2,516,847 | Boehm | Aug. 1, 1950 |
| 2,580,816 | Morin | Jan. 1, 1952 |